United States Patent
Yoon

(10) Patent No.: US 8,607,258 B2
(45) Date of Patent: Dec. 10, 2013

(54) CLAMPING DEVICE OF SPINDLE MOTOR HAVING A PLURALITY OF ARMS AND AN ELASTIC MEMBER

(75) Inventor: Hoeop Yoon, Gyeonggi-do (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/376,016

(22) PCT Filed: Jun. 2, 2010

(86) PCT No.: PCT/KR2010/003547
§ 371 (c)(1),
(2), (4) Date: Dec. 2, 2011

(87) PCT Pub. No.: WO2010/140840
PCT Pub. Date: Dec. 9, 2010

(65) Prior Publication Data
US 2012/0079509 A1    Mar. 29, 2012

(30) Foreign Application Priority Data
Jun. 2, 2009 (KR) .................. 10-2009-0048569

(51) Int. Cl.
*G11B 17/028* (2006.01)
(52) U.S. Cl.
USPC ........................................ 720/709; 720/604
(58) Field of Classification Search
USPC ................. 720/604, 605, 703, 704, 706–709, 720/712–714
See application file for complete search history.

(56) References Cited

U.S. PATENT DOCUMENTS

| 2007/0157219 A1* | 7/2007 | Oota | 720/604 |
| 2007/0200465 A1 | 8/2007 | Shiga | |
| 2008/0046905 A1* | 2/2008 | Takaki et al. | 720/707 |
| 2009/0106784 A1* | 4/2009 | Yoon | 720/706 |

FOREIGN PATENT DOCUMENTS

| CN | 1926620 A | 3/2007 |
| JP | 11-339348 A | 12/1999 |
| JP | 2000-067497 A | 3/2000 |
| JP | 2000-149363 A | 5/2000 |
| JP | 2002-334495 A | 11/2002 |
| JP | 2008-027514 A | 2/2008 |
| KR | 10-2008-0105815 A | 12/2008 |
| KR | 10-2009-0040606 A | 4/2009 |

OTHER PUBLICATIONS

International Search Report in International Application No. PCT/KR2010/003547, filed Jun. 2, 2010.
Office Action dated Jul. 2, 2013 in Chinese Application No. 201080034315.8, filed Jun. 2, 2010.
Office Action dated Nov. 13, 2012 in Japanese Application No. 2012-513869, filed Jun. 2, 2010.
Office Action dated May 21, 2012 in Japanese Application No. 2012-513869, filed Jun. 2, 2010.

* cited by examiner

*Primary Examiner* — Nathan Danielsen
(74) *Attorney, Agent, or Firm* — Saliwanchik, Lloyd & Eisenschenk

(57) ABSTRACT

The clamping device of spindle motor is disclosed, wherein a case portion contacted by the other distal end of the arms is inclined due to depression of a distal end of the arms by the disk, such that the arms linearly moves into the case to allow the other distal end to further rotate upwards, whereby the disk can be easily inserted into the case regardless of size of the inner diameter of the disk.

4 Claims, 4 Drawing Sheets

CLAMPING DEVICE OF SPINDLE MOTOR HAVING A PLURALITY OF ARMS AND AN ELASTIC MEMBER

CROSS-REFERENCE TO RELATED APPLICATIONS

This application is the U.S. national stage application of International Patent Application No. PCT/KR2010/003547, filed Jun. 2, 2010, which claims priority to Korean Application No. 10-2009-0048569, filed Jun. 2, 2009, the disclosures of each of which are incorporated herein by reference in their entirety.

TECHNICAL FIELD

The present invention relates to a clamping device of spindle motor, and more particularly to a clamping device of a spindle motor capable of easily inserting a disk and supporting a disk in response to various inner diameters of disks.

BACKGROUND ART

A spindle motor performs the function of rotating a disk to enable an optical pickup which linearly reciprocates in an optical disk drive (ODD) to read data recorded on the disk. The spindle motor is installed with a clamping device for supporting the disk mounted on a turn table or a rotor yoke.

Generally, the clamping device includes a case into which the disk is inserted, a plurality of claws integrally formed at a lateral plate of the case for supporting in such a way that a center of the disk corresponds to that of the case, a plurality of arms rotatively and linearly installed to enter the lateral plate of the case and to prevent the disk from being disengaged, and an elastic member elastically supporting the arms.

In a case the disk is inserted into the case, a front lateral upper surface of the arms is contacted by an inner lower corner portion of the disk, whereby the arms rotate in such a manner that the arms descend at a front end thereof while arms rise at a rear end thereof. In a case a rear upper surface of the arms is brought into contact with an upper plate of the case, the arms are restricted in rotation so that the arms linearly move into the lateral plate of the case.

The disk has a deviation in its inner diameter. Therefore, in a case a disk with a small inner diameter is inserted into the case, there is needed a large insertion force, while in a case a disk with a large inner diameter is inserted into the case, there is needed a smaller insertion force.

In the conventional clamping device of the spindle motor, a rotation angle of the arms is always constant, because an upper plate portion of the case contacting the rear end portion of the arms is formed with a thickness of flat even surface. The disk with a smaller inner diameter suffers from a disadvantage in that an excessive insertion force is needed in case of being inserted into the case.

DISCLOSURE OF INVENTION

Technical Problem

The present invention is disclosed to obviate the above-mentioned problems, and it is an object to provide a clamping device of a spindle motor capable of easily inserting the disk regardless of size of inner diameter of the disk.

Solution to Problem

In one general aspect of the present invention, there is provided a clamping device of a spindle motor, characterized by: a case rotating with a rotation shaft and inserted by an inner surface of a disk; a plurality of arms in which one distal end is positioned at a lateral outer side of the case to contact an inner surface of the disk, while the other distal end is positioned at a lateral inner side of the case for rotative and linear movement whereby the disk is prevented from being disengaged from the case; and an elastic member elastically supporting the arms toward the outer side of a lateral plate of the case, wherein if the disk is inserted into the case, the case portion contacting the other distal end of the arms is formed with an inclination surface whose thickness tapers off as it goes into the case because the disk depresses a distal end of the arm.

In some exemplary embodiments of the present invention, the inclination surface is formed with a plain surface.

In some exemplary embodiments of the present invention, the inclination surface is curved.

In some exemplary embodiments of the present invention, the inclination surface starts with a rounded form.

Advantageous Effects of Invention

The clamping device of a spindle motor according to the present invention is advantageous in that a case portion contacted by the other distal end of the arms is inclined due to depression of a distal end of the arms by the disk, such that the arms linearly moves into the case to allow the other distal end to further rotate upwards, whereby the disk can be easily inserted into the case regardless of size of the inner diameter of the disk.

MODE FOR THE INVENTION

A clamping device of a spindle motor according to the exemplary embodiments of the present invention will be described in detail with reference to the accompanying drawings.

Figure 1:
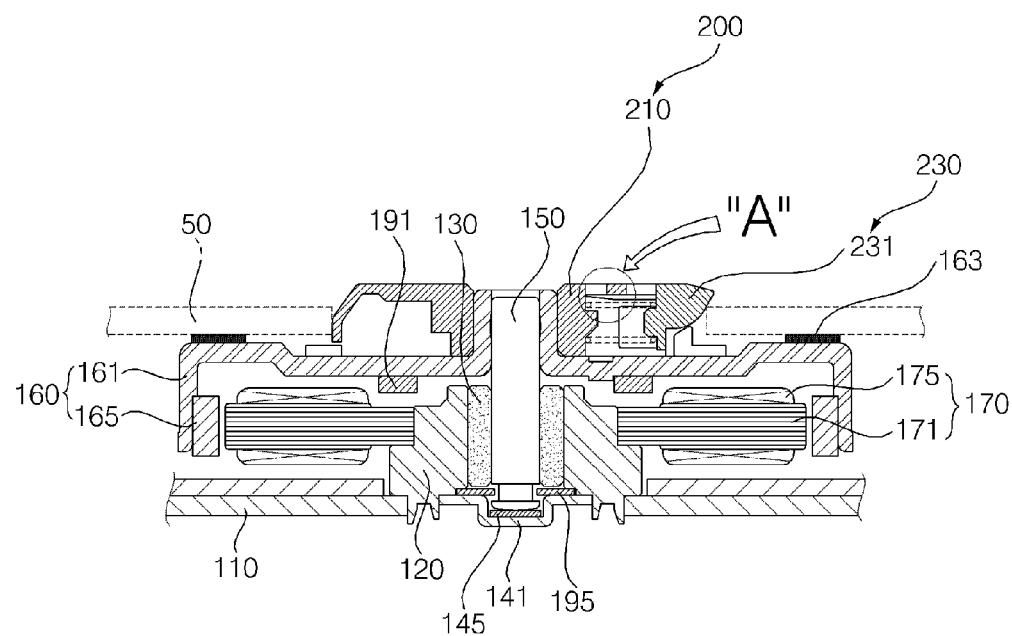
FIG. 1 is a cross-sectional view illustrating a spindle motor according to an exemplary embodiment of the present invention.

FIG. 1 is a cross-sectional view illustrating a spindle motor according to an exemplary embodiment of the present invention.

Referring to FIG. 1, a base (110) is vertically formed with a bearing housing (120).

In designating a direction and a surface of constituent parts, a direction and a surface facing an upper vertical side of the base (110) are respectively called "an upper side" and "an upper surface", while a direction and a surface facing a bottom vertical side of the base are respectively called "a bottom side" and "a bottom surface". A stator is provided at an upper surface of the base (110).

The cylindrical bearing housing (120) is opened at both ends, and a bearing (130) is press-fitted into an inner circumference of the bearing housing (120). A bottom surface of the bearing housing (120) is hermetically sealed by a thrust stopper (141), and the hermetically sealed bottom surface of the bearing housing (120) is coupled to the base (110). The bearing (130) is supported by a bottom side of a rotation shaft (150) for rotational installation.

A thrust plate (145) is formed at a bottom surface of the rotation shaft (150) and the thrust stopper (141) to prevent the thrust stopper (141) and the rotation shaft (150) from being brought into contact with each other, thereby preventing the tear and wear of the rotation shaft (150) and the thrust stopper (141).

An upper outer surface of the rotation shaft (150) exposed to upwards of the bearing housing (120) is coupled with a rotor (160), and an outer surface of the bearing housing (120) is coupled with a stator (170) rotating the rotor (160) in association with the rotor (160).

The rotor (160) is formed with a bottom-opened cylindrical rotor yoke (161) coupled at a central upper surface to the rotation shaft (150) to rotate with the rotation shaft (150), and a ring-shaped magnet (165) coupled to an inner surface of a rotor yoke (161) to oppose a periphery of the bearing housing (120).

The stator (170) is formed with a core (171) insertedly coupled to an inner surface of the bearing housing (120) and a coil (175) wound on the core (171).

In a case a current flows in the coil (175), the rotation shaft (150) and the rotor (160) are rotated by the electromagnetic force formed by the magnet (165) and the coil (175).

A felt (163) is coupled to an upper surface of the rotor yoke (161), and supports the rotor yoke (161) lest the disk (50) mounted on the rotor yoke (161) should slip away. A suction magnet (191) is coupled to the rotor yoke (161) to prevent the rotation shaft (150) and the rotor (161) from floating when the rotation shaft (150) and the rotor (160) are rotated, and a washer stopper (195) is interposed between the bearing housing (120) and the thrust stopper (141) to prevent the rotation shaft (150) from being disengaged upwards of the bearing housing (120).

The rotor yoke (161) portion coupled to the rotation shaft (150) is coupled to a clamping device (200) supporting the disk (50) mounted on the rotor yoke (161).

Now, the clamping device (200) according to the exemplary embodiment of the present invention will be described with reference to FIGS. 1 through 5.

Figure 2:
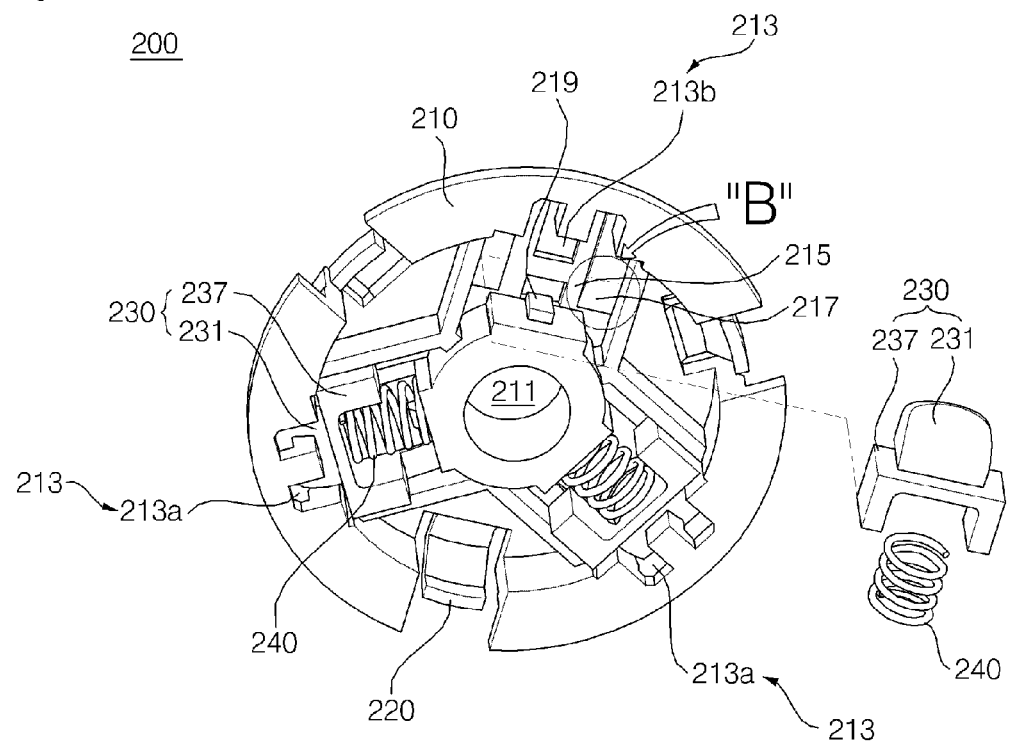
FIG. 2 is a bottom surface perspective view illustrating a clamping device of FIG. 1.
Figure 3:
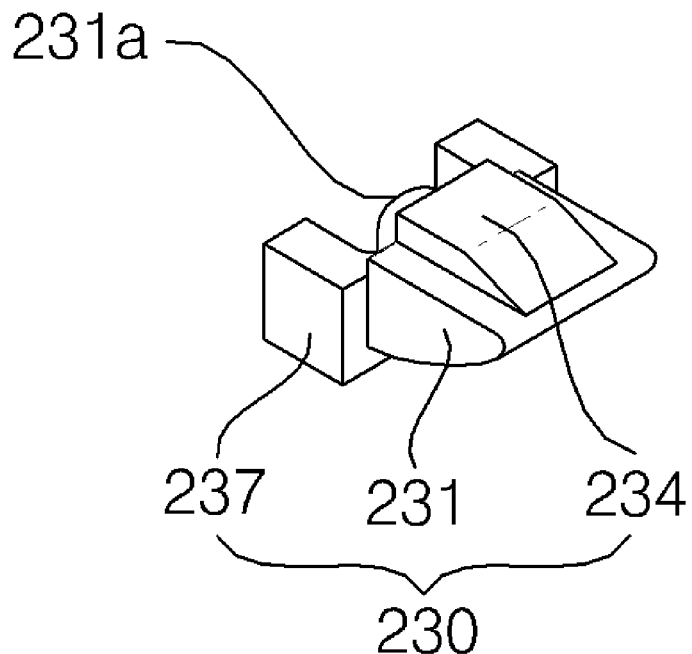
FIG. 3 is a plan perspective view of an arm illustrated in FIG. 2.
Figure 4:
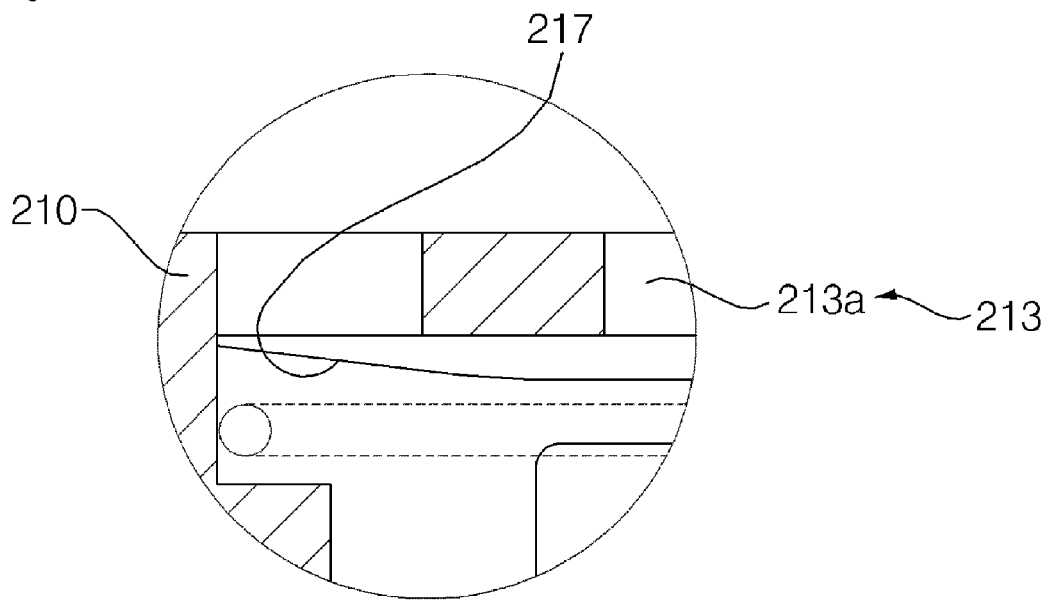
FIG. 4 is an enlarged view of "A" part of FIG. 1.
Figure 5:
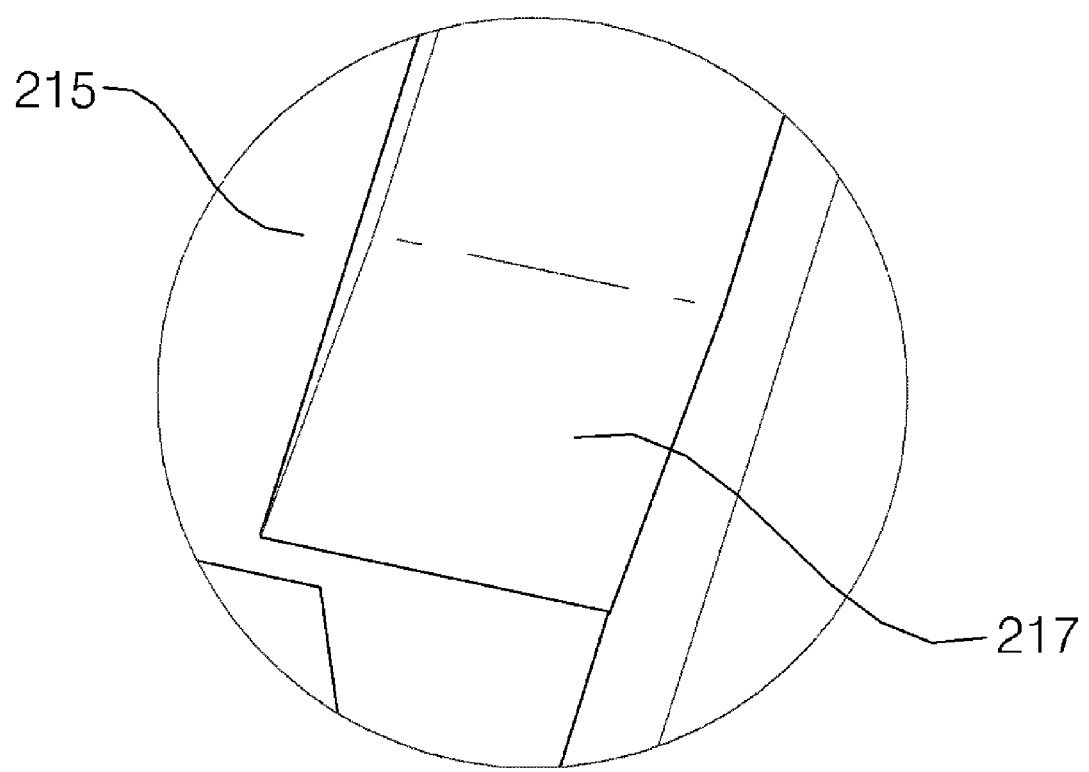
FIG. 5 is an enlarged view of "B" part of FIG. 2.

FIG. 2 is a bottom surface perspective view illustrating a clamping device of FIG. 1, FIG. 3 is a plan perspective view of an arm illustrated in FIG. 2, FIG. 4 is an enlarged view of "A" part of FIG. 1, and FIG. 5 is an enlarged view of "B" part of FIG. 2.

The clamping device (200) includes a case (210), claws (220), an arm (230) and an elastic member (240).

The case (210) is provided in a bottom-opened cylindrical shape. An upper central side of an upper plate of the case (210) is formed with a coupling hole (211) into which the rotor yoke (161) is coupled, and a lateral plate of the case (210) is inserted by the disk (50).

A plurality of claws (220) radially provided about the case (210) is integrally formed with the lateral plate of the case (210) and has an elasticity with a substantial cantilever shape. The claws (220) are brought into contact with an inner surface of the disk (50) inserted into the lateral plate of the case (210) to supportively allow the center of the disk (50) to correspond with that of the rotation shaft (150).

The case (210) is radially formed with a plurality of entry holes (213). The entry hole (213) is extended from an upper plate of the case (210) to the lateral plate of the case (210) to alternate with the claws (220) by being formed between the claws (220). Furthermore, the entry hole (213) near the claw (220) maintains an even gap. The entry hole (213) is positioned with an arm (230) formed with a body (231), a guide rail (234) and a disengagement prevention rail (237) to rotate and move in a linear manner.

The body (231) is positioned at one distal end thereof with a periphery of the lateral plate of the case (210) and at the other distal end with an inner surface of the lateral plate of the case (210) to enter the entry hole (213a) formed at the lateral plate of the case (210).

The guide rail (234) protrudes from the body (231) to be inserted into the entry hole (213b) formed on an upper plate of the case (210). The entry hole (213b) formed on the upper plate of the case (210) and the guide rail (234) functions to smoothly move the arms in a linear manner. A upwardly caved sill (215) is formed at a periphery of the entry hole (213) formed on the upper plate of the case (210) in order to securely support the linear movement of the arms (230), and an upper surface of the body (231) at the periphery of the guide rail (234) is accommodated with the sill (215).

The disengagement prevention rail (237) is extensively formed from the other distal end of the body (231) to the center side of the case (210). A distal end of the disengagement prevention rail (237) facing an peripheral later plate of the case (210) prevents the arms (230) from being disengaged to the peripheral lateral plate of the case (210) by being contacted with the lateral plate of the case (210) in a case the arms (230) are moving toward the lateral plate side of the case (210). It should be apparent that the body (231), the guide rail (234) and the disengagement prevention rail (237) are integrally moving.

A lower corner of the inner surface of the disk (50) is brought into contact with an upper surface of a distal end of the body (231) at the arm (230) in a case the disk (50) descends from an upper side of the case (210). Thereafter, in a case the disk (50) descends, a distal end of the body (231) of the arm (230) is lowered by the disk (50), while the other distal end of the disengagement prevention rail (237) of the arm (230) allows the arm (230) to rotate in an upward manner.

Then, an upper surface of the other distal end of the disengagement prevention rail (237) at the arm (230) is brought into contact with the upper plate of the case (210) to restrict the rotation of the arm (230), and in a case the disk (50) further descends in this state, the arm (230) linearly moves to the inner side of the lateral plate of the case (210).

Then, in a case the disk (50) further descends, an upper corner of the inner surface of the disk (50) is hitched by the lower surface at the distal end of the body at the arm (230) to prevent the disk (50) from being disengaged.

The disk (50) has a deviation in its inner diameter within an error range. Therefore, in a case a disk with a small inner diameter is inserted into the case, there is needed a large insertion force, while in a case a disk with a large inner diameter is inserted into the case, there is needed a smaller insertion force. In a case the insertion force for inserting the disk (50) into the case (210) is great, there is a difficulty of the disk (50) being inserted into the case (210).

The clamping device (200) according to the exemplary embodiment of the present invention is so provided as to allow the disk (50) to be easily inserted into the case (210) regardless of size of the inner diameter of the disk (50).

To be more specific, due to depression of the disk (50) on a distal end of the body (231) at the arm (230), an upper plate portion of the case (210) contacted by the upper surface of the other distal end of the disengagement prevention rail (237) of the arm (230) is formed with an inclination surface (217) whose thickness tapers off toward the inner side of the case (210). At this time, although the entire portion of the upper plate of the case (210) may be the inclination surface (217), the inclination surface preferably starts from a predetermined radius of an inner side of the case (210).

Then, in a case the disk with a smaller inner diameter is inserted into the case (210), the arm (230) linearly moves toward the inner side of the lateral plate of the case (210) to allow the other distal end to further rotate upwards, whereby the disk (50) can be easily inserted into the case (210) with a little force, in a case an upper surface at the other distal end of the disengagement prevention rail (237) is brought into contact with the inclination surface (217) of the case (210).

The inclination surface (217) is provided in a straight manner. However, as the inclination surface (217) moves toward the inner side of the case (210), the thickness of the inclination surface (217) tapers off, such that the inclination surface (217) may take the form of a concave shape or a convex shape. At this time, in order to allow the arm (230) to have a smooth movement, a starting portion of the inclination surface (217) is preferably rounded.

The elastic member (240) is installed inside of the lateral plate at the case, where a distal end of the elastic member (240) is supported by a support protruder (231a) of the arm (230), while the other end is supported by a support protruder (210) to elastically support the arm (230) towards the periphery at the lateral surface of the case (210), whereby the disk (50) is securely supported by the arm (230).

Figure 6:
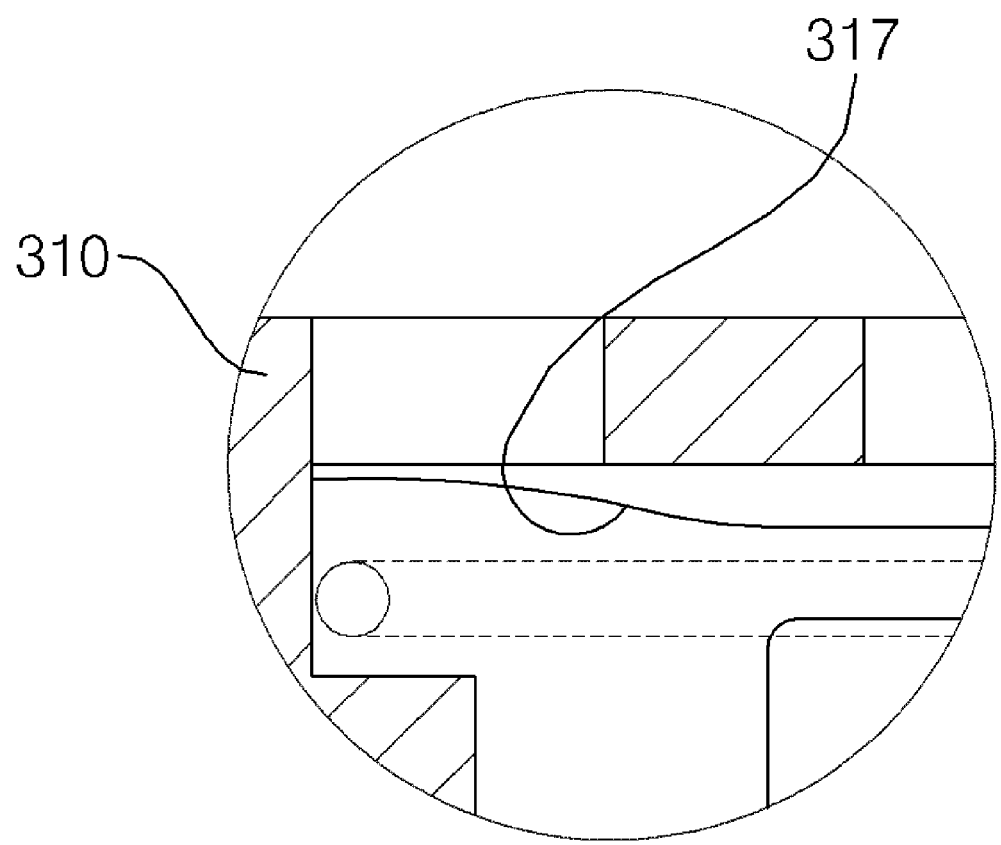
FIG. 6 is an enlarged view of essential parts according to another exemplary embodiment of the present invention.

FIG. 6 is an enlarged view of essential parts according to another exemplary embodiment of the present invention, where only difference from FIG. 5 will be described.

As depicted, an inclination surface (317) of a case (310) is formed with an upwardly curved shape.

While the present disclosure has been particularly shown and described with reference to exemplary embodiments thereof, the general inventive concept is not limited to the above-described embodiments. It will be understood by those of ordinary skill in the art that various changes and variations in form and details may be made therein without departing from the spirit and scope of the present invention as defined by the following claims.

The invention claimed is:

1. A clamping device of a spindle motor, characterized by:
    a case configured to rotate with a rotation shaft of the spindle motor and configured to clamp a disk of the spindle motor;
    a plurality of arms, wherein each arm of the plurality of arms comprises a body having a distal end positioned at a lateral outer portion of the case to contact an inner surface of a center hole of the disk, a pair of disengagement prevention rails extensively formed with the body, and a support protruder formed between the disengagement prevention rails; and
    an elastic member coupled to the support protruder, the elastic member elastically supporting each arm of the plurality of arms toward the lateral outer portion of the case;
    wherein the case has a plurality of inclination portions and a plurality of planar portions;
    wherein each inclination portion is formed at an inner surface of an upper portion of the case;
    wherein an upper face of each disengagement prevention rail is in contact with an inclination portion of the plurality of inclination portions, respectively, when disk is coupled with the body;
    wherein each planar portion of the case is connected to an inclination portion of the plurality of inclination portions and is parallel to the remaining inner surface of the upper portion of the case other than the inclination portions; and
    wherein each inclination portion of the plurality of inclination portions comprises an inclination surface whose thickness tapers off as it approaches the lateral inner portion of the case, thereby allowing the upper face of the disengagement prevention rail with which it is in contact to depress upon insertion of the disk into the spindle motor.

2. The device of claim 1, wherein each inclination surface comprises a flat surface.

3. The device of claim 1, wherein each inclination surface comprises a curved surface.

4. The device of claim 1, wherein each inclination surface comprises a proximal portion positioned at the lateral inner portion of the case, and wherein the proximal portion of each inclination surface comprises a rounded surface.

* * * * *